United States Patent
Ziolo et al.

[11] Patent Number: 5,927,621
[45] Date of Patent: Jul. 27, 1999

[54] PARTICLE SIZE REDUCTION PROCESS

[75] Inventors: Ronald F. Ziolo, Webster; Rachel L. Pieczynski, Orchard Park, both of N.Y.

[73] Assignee: Xerox Corporation, Stamford, Conn.

[21] Appl. No.: 08/890,839

[22] Filed: Jul. 10, 1997

[51] Int. Cl.⁶ .................................................. B02C 17/00
[52] U.S. Cl. ........................... 241/21; 241/24.1; 241/170
[58] Field of Search ............................. 241/21, 170, 171, 241/172, 27, 1–25

[56] References Cited

U.S. PATENT DOCUMENTS

| | | | |
|---|---|---|---|
| 4,824,587 | 4/1989 | Kwon et al. | 252/62.55 |
| 4,917,834 | 4/1990 | Hadermann et al. | 264/8 |
| 5,141,837 | 8/1992 | Nguyen et al. | 241/27 |
| 5,362,417 | 11/1994 | Ziolo | 252/314 |
| 5,714,536 | 2/1998 | Ziolo et al. | 524/430 |

FOREIGN PATENT DOCUMENTS

0 586 051  3/1994  European Pat. Off. .

OTHER PUBLICATIONS

Ambrose, T. et al., "Formation and Magnetic Properties of nanocomposite Fe–Al2O3 Using High Energy Ball Milling", Journal of Magnetism and Magnetic Materials, vol. 116, No. 3, Oct. 1, 1992, pp. L311–L314.

Giri, A.K., "Magnetic Properties of Iron–Polyethylene Nanocomposites Prepared by High Energy Ball Milling", Journal of Applied Physics, vol. 81, No. 3, Feb. 1, 1997, pp. 1348–1349.

*Primary Examiner*—Joseph J. Hail, III
*Attorney, Agent, or Firm*—John L. Haack

[57] ABSTRACT

A process comprising: milling first particles, second particles, and a milling component, wherein the first particles are reduced in average diameter particle size to from about 3 to about 100 nanometers.

23 Claims, No Drawings

PARTICLE SIZE REDUCTION PROCESS

REFERENCE TO COPENDING AND ISSUED PATENTS

Attention is directed to commonly owned and assigned copending applications: U.S. Ser. No. 08/178,540 filed Jan. 7, 1994, entitled "Magnetic and Nonmagnetic Particles and Fluid, Methods of Making and Methods of Using the Same", which discloses low optical density magnetic fluids for use in liquid development compositions and wherein a submicron particle size ion exchange resin may be selected to avoid further micronization or particle size reduction processing steps; U.S. Ser. No. 08/290,125 filed Jul. 15, 1994, entitled "Magnetic Nanocomposite Compositions and Processes for the Preparation and Use Thereof", which discloses a magnetic nanocomposite composition comprising from about 0.001 to about 60 weight percent of nanocrystalline particles of $Fe_3O_4$, and from about 40 to about 99.999 weight percent of a resin; U.S. Ser. No. 08/332,174 filed Nov. 31, 1994, entitled "Magnetized Pigments and Method and Apparatus for Producing Magnetized Pigments", which discloses a method and apparatus for producing magnetized pigments by forming a pigment coating on an external surface of a magnetic material core wherein the magnetized pigment is produced by forming a vaporized core of a magnetic material and forming the pigment coating on the magnetic material core; U.S. Ser. No. 08/500,215 filed Jul. 10, 1995, now U.S. Pat. No. 5,641,424, entitled "Magnetic Refrigerant Compositions and Processes for Making and Using"; U.S. Ser. No. 08/584,585 filed Jan. 11, 1996, now U.S. Pat. No. 5,714,536, entitled "Magnetic Nanocompass Compositions and Processes for Making and Using"; U.S. Ser. No. 08/600,664 filed Feb. 14, 1996, now U.S. Pat. No. 5,667,924, entitled "Superparamagnetic Image Character Recognition Compositions and Processes Of Making and Using"; U.S. Ser. No. 08/674,306 filed Jul. 7, 1996, now U.S. Pat. No. 5,667,716, entitled "High Magnetization Aqueous Ferrofluids and Processes for Preparation and Use"; and U.S. Ser. No. 08/787,189 filed Jan. 27 1997, entitled "High Density Magnetic Recording Compositions and Processes Thereof".

Attention is directed to commonly owned and assigned U.S. Pat. No. 4,474,866, issued Oct. 2, 1984, entitled "Developer Compositions Containing Superparamagnetic Polymers" which discloses a developer composition containing superparamagnetic polymers; U.S. Pat. No. 5,322,756, issued Jun. 21, 1994, entitled "Expedient Method for the Preparation of Magnetic Fluids and other Stable Colloidal Systems"; and U.S. Pat. No. 5,362,417, issued Nov. 8, 1994, entitled "Method of Preparing a Stable Colloid of Submicron Particles", which discloses submicron particles which are dispersible to form an aqueous colloid. Also disclosed in the '417 patent is a method of forming the stable dispersion which includes providing an ion exchange resin, loading the ion exchange resin with an ion, and treating the loaded resin to form nanoscale particles. The resin and nanoparticles can be fluidized to form an aqueous stable colloid. Also of interest is U.S. Pat. No. 5,358,659, issued Oct. 25, 1994, entitled "Magnetic Materials with Single-Domain and Multidomain Crystallites and a Method of Preparation"; and U.S. Pat. No. 4,457,523, issued Oct. 10, 1995, entitled "Ferrofluid Media Charging of Photoreceptors".

The disclosures of each the above mentioned patents are incorporated herein by reference in their entirety.

BACKGROUND OF THE INVENTION

The present invention is generally directed to processes for the preparation of submicron and nanometer sized particles. More specifically, the present invention relates to processes for the preparation of submicron sized particles and smaller by a particle size reduction method wherein micron sized particles or larger, and including submicron sized particles, and mixtures of the aforementioned particles can be ground to submicron and nanometer sized dimensions using conventional grinding or milling equipment, for example, a ball mill or attritor. The improved process is accomplished primarily by the use of a "matrix assisted" milling media comprising an ionic nanocomposite grinding aid or adjuvant comprised of nanocomposite particles comprised of, for example, nanoscopic magnetic particles and at least one ionic host resin.

Conventional ball milling of industrial powders or pigments typically leads to particulates which are on the order of about 1 to 2 micrometers in diameter, and generally not less than about 0.1 micrometers in size under optimal or extreme conditions. See for example, *"Dispersion of Powders in Liquids"*, 3rd ed., G. D. Parfitt Ed., Applied Science Publishers, 1981, the disclosure of which is incorporated by reference herein in its entirety. Moreover, attempts to mill or grind particles to their primary particle size or to sizes smaller than about 100 nanometers usually fail because of particle aggregation or agglomeration into larger particles from Van der Waals' forces between like particles.

The prior art discloses methods of preparing submicron and smaller particles, for example, where nanometer sized particles must be prepared or grown de novo, that is, built up from individual atoms constituting the desired particle. This approach is disadvantaged in a number of respects, for example, the method requires that the reactants be maintained at low instantaneous concentrations to avoid large particle formation or agglomeration; and the product particles are typically at high dilution so that isolation and purification are costly and labor intensive.

The present invention, in embodiments, provides a superior small particle preparative process wherein a particle size reduction process permits large size particles, for example, of from about 0.1 micrometers to 10,000 micrometers or more, to be reduced in size to particles with below about 0.1 micrometers or 100 nanometers utilizing conventional ball mill or grinding equipment, for example, in embodiments, to volume average diameters of from about 3 to about 30 nanometers. The processes of the present invention also permits submicron sized particles to be further reduced in size, for example, of from about 200 to about 800 nanometers to less than about 100 nanometers.

The processes and products of the present invention are useful in many applications, for example, as a variety of specialty applications including liquid developer compositions for electrophotographic, magnetographic, and ink jet imaging processes. In embodiments of the present invention, the preparative processes are useful in formulating dry and liquid containing small sized particulate marking materials for use in printing applications, and for the preparation of small sized particulate colored and weakly colored ferrofluids for use in known applications.

Magnetic fluids selected for the present invention include those fluids which are known in the art as "ferrofluids". Magnetic ferrofluids, or ferrofluids, are ultra-stable colloidal suspensions of magnetic particles in a liquid carrier. These fluids behave as homogeneous Newtonian liquids and can react with an external magnetic field. The liquid carrier or base may be hydrocarbon, fluorocarbon, silicone oil, water, ester, or similar liquid. Magnetic fluids are commercially available in a range of liquid carriers and display a saturation magnetization as high as about 1,000 gauss. These fluids may be produced by several different methods. Magnetic fluids were first produced it is believed by the long term grinding of magnetite in a hydrocarbon, such as kerosene, containing an appropriate dispersing agent such as oleic acid, as disclosed, for example, in U.S. Pat. No. 3,215,572. A review of the properties and behavior of magnetic fluids may be found in an article by R. E. Rosenweig entitled "Magnetic Fluids" in International Science & Technology, July 1966, pp. 48–56, the disclosure of which is incorporated herein by reference in its entirety.

PRIOR ART

U.S. Pat. No. 5,362,417, issued Nov. 8, 1994, to Ziolo, discloses a method of forming a colloidal dispersion of fine particles comprising: providing a submicron ion exchange resin which remains suspended in a fluid medium; loading said resin with an ion; treating the resin to cause in-situ formation of submicron particles and forming a stable colloid; and micronizing the resin and particles in said colloid.

The aforementioned reference is incorporated in its entirety by reference herein.

Thus, there remains a need for simple and economical processes for particle size reduction wherein submicron and nanoscopic sized particles can be obtained and which particles are substantially precluded from agglomeration or aggregation Practitioners in the art have sought an inexpensive, efficient and environmentally efficacious method for particle size reduction which affords size reduced particles on less than about 0.1 micrometer and which particles are precluded from agglomeration or aggregation by the presence of a milling matrix material.

The aforementioned and other disadvantages are avoided, or minimized with the particle size reduction processes of the present invention.

SUMMARY OF THE INVENTION

Embodiments of the present invention, include:

overcoming, or minimizing deficiencies of prior art processes, by providing particle size reduction processes with improved particle reduction capability, efficiency, improved flexibility, and operational economies; and providing processes, for example, a particle size reduction process comprising:
  milling first particles, second particles, and a milling component, especially a milling substrate, wherein said first particles are reduced in average diameter particle size to from about 3 to about 100 nanometers.

Other embodiments of the present invention provide processes for preparing magnetic ink compositions comprising:
  milling a mixture comprised of colorant particles, especially pigment particles, nanocomposite milling matrix particles, ball shot, for from about 30 minutes to 10 days, at a mill rate of about 50 to about 200 feet per minute to provide a first milled mixture;
  separating the shot from the first milled mixture to provide a second mixture of colorant, especially pigment particles and nanocomposite milling matrix particles; and
  optionally separating the nanocomposite milling matrix particles from the second mixture to afford colorant particles, especially pigment particles with a volume average particle size of from about 10 to about 100 nanometers.

DETAILED DESCRIPTION OF THE INVENTION

The particle size reduction processes of the present invention may be used to process and prepare a variety of submicroscopic and nanoscopic size particles and related materials, for example, colorants, pigment, dyes, metal oxides, salts of organic and inorganic compounds, and the like, and mixtures thereof.

The sized reduced particles afforded by the present invention are suitable for a variety of uses such as for example, in preparing high resolution liquid and dry developer marking and ink compositions, for use in printing applications, and for preparing colored and colorless ferrofluids. The processes and products of the present invention are useful in many other applications, for example, as a variety of specialty applications including liquid developer compositions used in electrophotographic, magnetographic, ionographic, thermal transfer, and ink jet imaging processes.

Conventional ferrofluid compositions are typically dark brown in color. In embodiments of the present invention, there are provided preparative processes that can be selected to prepare ferrofluid compositions which have colors other than conventional dark brown as illustrated herein. Thus, the processes of the present invention can directly provide, for example, pigmented ferrofluid compositions wherein the typical dark color is masked by pigments or other colorants coating the surfaces of the magnetic ferrofluid particles.

Another advantage of the present invention is that the processes thereof afford control over the size of the resulting particles in the submicron and nanometer size range, and the processes enable the preparation of uniform dispersions of ultrafine particles which in turn provide a high level of control over the stability properties of the resulting particles, for example, in preventing aggregation or agglomeration of the size reduced particles.

In embodiments, the present invention provides particle size reduction processes for the preparation of submicron and nanometer sized particles comprising, for example, milling a mixture of first particles, second particles, and a milling substrate, so that the first particles are reduced in volume average or average diameter particle size from greater than about 0.01 micrometer, such as from about 0.1 to 10,000 micrometers to less than, or equal to from about 3 to about 100 nanometers, and more specifically from about 3 to about 30 nanometers. In embodiments, the present invention provides particle size reduction processes for the preparation of submicron and nanometer sized particles comprising, for example, milling a mixture of first particles, second particles, and a milling substrate, so that said first particles are size reduced in volume average particle size from greater than about 0.01 micrometers to less than from about 3 to about 100 nanometers. In embodiments, the present invention provides processes comprising: mixing first particles, second particles dissimilar than said first particles, and a milling component, and wherein said first particles are reduced in volume average diameter to from about 3 to about 100 nanometers.

In embodiments of the present invention, the first particles prior to milling are from about 0.1 micrometer to about 1,000 micrometers in volume average diameter. In exemplary embodiments of the present invention, the particle size reduction process is capable of affording size reduced particles of from about 3 nanometers to about 30 nanometers. The first particles in embodiments, can comprise at least one colorant, such as pigment, and in embodiments, from about 2 to about 10 pigments are selected. In embodiments, the first particles are comprised of carbon black. In other embodiments, the first particles can be selected from organic pigments, organic dyes, inorganic pigments, metal oxides, mixed metal oxides, metal halides, organic compounds, salts of organic compounds, inorganic compounds, salts of inorganic compounds, brittle and non-brittle polymers, rubbers, pharmaceutically active compounds, filler particles, plastics, clays, glasses, lime, gypsum product particles, conductive particles, semiconductive particles, insulating particles, and related materials, and mixtures thereof.

The size reduced particles resulting from the milling step of the present invention are primarily uniformly dispersed among the second particles. The size reduced particles are highly stabilized, for example, against phase separation, and are highly resistant to agglomeration or aggregation.

The second particles serves primarily as a milling matrix or milling adjuvant material and these particles are comprised of known nanocomposite particles comprised of, for example, an ionic exchange host resin or similar ion exchange host material and uniformly dispersed nanosized metal or metal oxide particles, reference for example, the aforementioned commonly owned and assigned U.S. Pat. No. 5,362,417, and copending application U.S. Ser. No. 08/600,664.

To produce the second particles or milling matrix material, an ion exchange resin or other porous ion exchangeable material, such as silica or titania, can be selected as a framework or host in which to grow the nanosized metal or metal oxide particles. A porous resin provides numerous isolated reactions sites, which can be envisioned as "nano reactors" which are uniformly dispersed throughout the resin matrix. As a metal particle cluster grows to form individual metal or metal oxide particles at each nano reactor site, the newly formed nanoparticles are held in place by the matrix and are thus prevented from aggregating or agglomerating. In embodiments, an iron oxide loaded ion exchange resin, also known as Low Optical Density Magnetic (LODM) material is a exemplary milling matrix material that is easily balled milled to nanometer dimensions due to internal strain caused by the high loading of iron oxide particles within the crosslinked resin. Although not desired to be limited by theory, when pigment or other particles to be reduced in size are milled with the milling matrix material, as in the present invention, the matrix serves to stabilize the nanosized particles as they are produced and thereby prevent agglomeration or aggregation of the metal or metal oxide small particles residing within the matrix. Separation of the sized reduced particles from the second particles or milling matrix can, if desired, be readily accomplished by displacing the LODM with, for example, a dispersing agent such as oleic acid or other suitable fatty acid or comparable dispersant. In a preferred embodiment, the second particles are comprised of a nanocomposite prepared in accordance with the aforementioned commonly owned and assigned U.S. Pat. No. 5,322,756 wherein 8 to 10 nanometer sized iron oxide particles are grown in the ion exchange resin. The metal or metal oxide nanoparticles contained in the ion exchangeable host is present, in embodiments, in an amount of from about 5 to about 60 weight percent based on the weight of the nanocomposite. The polymer composite or milling matrix material used and illustrated herein, comprises, in embodiments, a 4 weight percent crosslinked sulfonated polystyrene resin loaded, and presumably substantially ionically bound and physically entrapped, with 50 weight percent of nanoscopic iron oxide particles. In embodiments, the second particles are comprised of nanocomposite particles comprised of from about 5 to about 95 weight percent an ionic exchange host material, preferably crosslinked, and containing therein uniformly dispersed nanosized metal or metal oxide particles in an amount of from about 5 to about 60 weight percent based on the weight of the nanocomposite. In embodiments, the second particles are comprised of a nanocomposite comprising of from about 20 to 80 weight percent crosslinked sulfonated polystyrene resin loaded with of from about 30 to about 60 weight percent of nanoscopic iron oxide particles. The ionic polymer component is, for example, a divinyl benzene crosslinked cation exchange resin, available from a variety of commercial sources, including Rohm and Haas, and Dow Chemical Co.

Thus in an illustrative embodiment, when first particles such as colored pigments, metal halides, and the like, separately or in admixture, were ball milled with steel shot and second particles comprised of the aforementioned polymer composite material, referred to as milling matrix material, comprised of an ion exchange resin filled with inert nanoscopically sized metal oxide particles, such as $Fe_2O_3$ or $Fe_3O_4$, there resulted submicron or nano sized particles of the aforementioned pigments, metal halides, and the like, of the first particles. The resulting nanoparticulates arising from the first particles can be, used "as is", dispersed in a liquid medium, or can be physically separated from the milling matrix material for use in applications requiring highly stable dispersions or superior performance characteristics, for example in carrier coatings, and liquid and dry toner or ink compositions for printing applications.

The milling component or substrate is, for example, a non friable ball, shot, cylinders, and the like milling materials, comprising materials such as, steel, iron, lead, glass, ceramic, ceramer, plastic, impact resistant plastics, and the like materials, and mixtures thereof, with a size range typically of from about $1/16$th to about $1/2$ inch in diameter. Other similarly sized milling substrates are believed to suitable but may be less readily available commercially.

The milling can be accomplished in a roll mill at a number of suitable speeds, for example, there can be selected speeds of from about 10 to about 10,000 feet, and preferably from about 100 to about 5,000 per minute, in various effective times, for example, from about 30 minutes to about 30 days. In other embodiments, the milling can be accomplished in from about 12 hours to about 10 days. In embodiments, an example of a preferred milling machine is available as Pulverisette made by Fritsch GmbH, Germany.

In embodiments, the resulting size reduced first particles can be readily separated from the second particles and the milling substrate, with a variety of known methods, for example, mechanically, magnetically, electrostatically, gravitationally, centrifugationally, floatationally, sedimentationally, ultrafiltrationally, air blow-off, sieving, and the like methods, and combinations thereof. In other embodiments, the process can be modified by including or adding a liquid component to the mixture of particles to be ground prior to, during, or after, the milling, for example, for the purpose of forming liquid dispersions of the first particles, or for formulating liquid imaging compositions. Thus, in embodiments of the present invention, there are provided processes for preparing a magnetic ink composition comprising:

milling a mixture comprised of colorant particles, nanocomposite milling matrix particles, ball shot, for from about 30 minutes to 10 days, at a mill rate of about 50 to about 200 feet per minute to provide a first milled mixture;

separating the shot from the first milled mixture to provide a second mixture of colorant, especially particles and nanocomposite milling matrix particles; and optionally separating the nanocomposite milling matrix particles from the second mixture to afford colorant particles with a volume average particle size of from about 10 to about 100 nanometers.

The magnetic ink preparative process may further comprise adding a liquid carrier to the first resulting milled mixture and milling the resulting liquid containing mixture for a time such that the colorant, such as pigment particles and matrix particles are uniformly dispersed in the mixture. Another modification of the aforementioned process comprises centrifuging the uniformly dispersed mixture to separate any large particle aggregates therefrom. Yet another modification of the process comprises ultrafiltering the uniformly dispersed mixture to concentrate the mixture into a stable uniformly dispersed pigmented ferrofluid. Still another modification of the foregoing process comprises freeze drying the stable uniformly dispersed pigmented ferrofluid to obtain ultrafine pigmented magnetic particles.

The resulting sized reduced particles and compositions containing the sized reduced particles are useful in formulating a variety of dry and liquid developers, and imaging processes thereof, particularly for high quality color imaging, reference for example, U.S. Pat. No. 5,591,559, and references therein, the disclosure of the '559 patent being incorporated by reference herein in its entirety.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

Organic Pigment Particle Size Reduction—Dry Milling. Pigment particles in powdered form with particle sizes of approximately 30–270 nm and more specifically, 50 to 80 nm size available from, for example, BASF, were milled with LODM, a low optical density magnetic material comprising a nanostructured material of iron oxide particles dispersed in a cross-linked sulfonated polystyrene resin, to afford ultrafine particle colored magnetic powders and liquids as follows. In a typical example, 2 grams of LODM-1, comprising 6.3 micrometer size polymer resin particles containing 55.5 weight percent $Fe_2O_3$. 1 gram of BASF powdered pigment, and 200 grams of one quarter inch stainless steel shot were combined in a four ounce glass jar and roll milled at about 120 feet per minute for seven days. There results a colored magnetic powder. Twenty milliliters of deionized water was added and the resulting mixture milled for an additional 16 hours. The fluid was then centrifuged at 8,000 Gs for about 15 minute increments until no solids fell out of the mixture. The resulting fluid was ultrafiltered through a 30,000 molecular weight cut-off membrane to concentrate the material to a highly stable colored ferrofluid. The foregoing preparative process was effective in preparing stable colored ferrofluids with the following BASF powdered pigments. HELIOGEN GREEN K 8730, FANAL PINK D 4830 FANAL VIOLET 5460, and HELIOGEN BLUE K 7090. A portion of the colored ferrofluids was further freeze dried to make ultrafine particle colored magnetic powders.

EXAMPLE II

Organic Pigment Particle Size Reduction—Liquid Milling. Pigment particles as aqueous dispersions were obtained from BASF that, for example, had acicular shaped particles with widths ranging from about 15 to about 35 nm, and lengths ranging from about 30 to about 120 nm or higher. To prepare nanoscopically sized particle liquid dispersions, the commercially available pigment dispersions in equivalent active amounts were added to a jar containing the LODM material and the shot as in Example I which had been milled for 7 days in dry form. Thus for example, 5 grams of the commercially available pigment dispersion was mixed with 15 milliliters of deionized water and then added to the LODM and shot mixture and milled for 16 hours. The centrifugation and ultrafiltration processes were accomplished as in Example I. The BASF colored pigment dispersions included: BASOFLEX PINK 4810, DISPERS BLUE 69-0007, AND DISPERS GREEN 87-3007.

Scanning and transmission electron microscopies were used to analyze the resulting powders obtained from both the dry and the liquid preparative Examples I and II. Particle sizes of the dispersed pigments were usually less than about 3 nm with a range of about 2 to about 30 nanometers. The particle dispersions in both the dry and the liquid samples were homogenous. The measured magnetization of the colored liquid and dry samples were typical of nanostructured magnetic materials ranging from 1 to about 25 electromagnetic units per gram (emu/g) in an applied field of about 6,000 Oersteds. The freeze dried sample from Example I had a magnetization of 17 emu/g while many other examples of formulated powders and liquids containing the sized reduced particles fell in the range of from 2 to about 20 emu/g. Samples prepared using HELIOGEN GREEN K 8730, FANAL PINK D4830, and DISPERS BLUE 69-0007 were passed through a Canon Company ink jet printer to print text and images on paper and transparencies.

EXAMPLE III

Carbon Black Dispersion. One gram of REGAL 330 beaded carbon black, was combined with 2 grams of LODM-2 comprised of 60.0% $Fe_2O_3$, with an average nanocomposite particle size of about 6.7 microns, and 200 grams of one quarter inch stainless steel shot in a four ounce glass jar and roll milled at 120 feet per minute for seven days. Examples were conducted with different carbon black pigment to LODM-2 milling matrix ratios, and also with different ratios of LODM-1 milling matrix, with the result that, in all instances, electron microscopy of the resulting milled material indicated that the carbon black was reduced from its original size of 80 microns to about 0.025 microns or 25 nanometers and below.

EXAMPLE IV

Copper Iodide. Copper iodide crystals ranging in size from about 1 to 3 microns were separately milled with LODM-1, to produce nanosized copper iodide particles. In these examples, 2 grams of LODM-1 were combined with 1 gram of copper iodide and 200 grams of one quarter inch stainless steel shot in a four ounce glass jar and roll milled at approximately 120 feet per minute for seven days. A transmission electron microscopic analysis of the resulting powder showed copper iodide crystallite size of about 10 nanometers. The average particle size was determined by known methods, for example, statistically averaging particle volume or diameter measurements of representative samples and a measured by, for example, calibrated particle standards, or internal and external standards.

Other modifications of the present invention may occur to one of ordinary skill in the art based upon a review of the present application and these modifications, including equivalents thereof, are intended to be included within the scope of the present invention.

What is claimed is:

1. A process comprising:

a single milling of first particles, second particles, and a milling component, wherein said second particles are comprised of nanocomposite milling matrix particles comprised of from about 5 to about 95 weight percent an ionic exchange host material containing therein uniformly dispersed nanosized metal or metal oxide particles in an amount of from about 5 to about 60 weight percent based on the weight of the nanocomposite, wherein said milling component is comprised of non friable ball shot material, wherein said second particles and said milling component are substantially unchanged in average particle size, and wherein said first particles prior to milling are from about 0.01 micrometer to about 1,000 micrometers in volume average diameter and are reduced in average diameter particle size to from about 3 to about 100 nanometers.

2. A process in accordance with claim 1, wherein said first particles are friable.

3. A process in accordance with claim 1, wherein said first particles comprise at least one colorant.

4. A process in accordance with claim 3, wherein from about 2 to about 10 colorants are selected.

5. A process in accordance with claim 1, wherein said reduced particles are from about 3 nanometers to about 30 nanometers in average diameter.

6. A process in accordance with claim 1, wherein said first particles comprise carbon black.

7. A process in accordance with claim 1, wherein said first particles are selected from the group consisting of organic pigments, organic dyes, inorganic pigments, metal oxides, mixed metal oxides, metal halides, salts of organic compounds, salts of inorganic compounds, polymers, rubbers, pharmaceutically active compounds, filler particles, plastics, clays, glasses, lime, gypsum product particles, conductive particles, semiconductive particles, insulating particles, and mixtures thereof.

8. A process in accordance with claim 1, wherein said reduced particles are uniformly dispersed within said second particles, and wherein said reduced particles are resistant to agglomeration or aggregation.

9. A process in accordance with claim 1, wherein said second particles are comprised of a nanocomposite comprising of from about 20 to 80 weight percent crosslinked sulfonated polystyrene resin loaded with of from about 30 to about 60 weight percent of nanoscopic iron oxide particles.

10. A process in accordance with claim 1, wherein said non friable ball shot material is selected from the group consisting of steel, iron, lead, glass, ceramic, ceramer, plastic, and mixtures thereof, and which said milling component is a substrate of a size range of from about 1/16th inch to about ½ inch in diameter.

11. A process in accordance with claim 1, wherein said milling is accomplished in a roll mill at a speed of from about 10 to about 10,000 feet per minute.

12. A process in accordance with claim 1, wherein said milling is accomplished in from about 30 minutes to about 30 days.

13. A process in accordance with claim 1, wherein said milling is accomplished in from about 12 hours to about 10 days.

14. A process in accordance with claim 1, further comprising adding a liquid to the mixture prior to, during, or after, said milling.

15. A process in accordance with claim 1, further comprising separating said resulting size reduced first particles from said second particles and said milling substrate.

16. A process in accordance with claim 15, wherein said separating is accomplished from the methods selected from the group consisting of mechanically, magnetically, electrostatically, gravitationally, centrifugationally, floatationally, sedimentationally, ultrafiltrationally, air blow off, sieving, and combinations thereof.

17. A process in accordance with claim 1, wherein said milling is accomplished in a roll mill at a speed of 120 feet per minute for seven days.

18. A process for preparing a magnetic ink composition comprising:

milling a mixture comprised of colorant particles, nanocomposite milling matrix particles, ball shot, for from about 30 minutes to 10 days, at a mill rate of about 50 to about 200 feet per minute to provide a first milled mixture; and separating the shot from the first milled mixture to provide a second mixture comprised of colorant particles and nanocomposite milling matrix particles, wherein the colorant particles in the first milled mixture have a volume average particle size of from about 10 to about 100 nanometers prior to any further processing of the first milled mixture.

19. A process in accordance with claim 18, further comprising adding a liquid carrier to the first resulting milled mixture and milling the resulting liquid containing mixture for a time such that the pigment particles and matrix particles are uniformly dispersed in the mixture.

20. A process in accordance with claim 19, further comprising centrifuging the uniformly dispersed mixture to separate any large particle aggregates therefrom.

21. A process in accordance with claim 20, further comprising ultrafiltering the uniformly dispersed mixture to concentrate the mixture into a stable uniformly dispersed pigmented ferrofluid.

22. A process in accordance with claim 21, further comprising freeze drying the stable uniformly dispersed pigmented ferrofluid to obtain ultrafine pigmented magnetic particles.

23. A process in accordance with claim 18, further comprising separating the nanocomposite milling matrix particles from the second mixture.

* * * * *